(12) United States Patent
Massey et al.

(10) Patent No.: US 7,470,197 B2
(45) Date of Patent: Dec. 30, 2008

(54) ON-LINE GAMING WITH INDEPENDENT PLAYER MATCHING

(76) Inventors: Graham Peter Massey, 221 King's Road, 1st Floor, Chelsea, London SW3 5EJ (GB); Claire Gilmore McDonald, 221 King's Road, 1st Floor, Chelsea, London SW3 5EJ (GB)

( * ) Notice: Subject to any disclaimer, the term of this patent is extended or adjusted under 35 U.S.C. 154(b) by 503 days.

(21) Appl. No.: 10/486,863

(22) PCT Filed: Aug. 19, 2002

(86) PCT No.: PCT/GB02/03808

§ 371 (c)(1),
(2), (4) Date: Feb. 12, 2004

(87) PCT Pub. No.: WO03/017214

PCT Pub. Date: Feb. 27, 2003

(65) Prior Publication Data

US 2004/0248652 A1 Dec. 9, 2004

(30) Foreign Application Priority Data

Aug. 17, 2001 (GB) .................................. 0120135.9

(51) Int. Cl.
*G06F 17/00* (2006.01)
*G06F 19/00* (2006.01)

(52) U.S. Cl. ................................ 463/42; 463/1; 463/25; 463/40; 700/91

(58) Field of Classification Search ................ 463/13, 463/26, 27, 28, 42
See application file for complete search history.

(56) References Cited

U.S. PATENT DOCUMENTS

| 5,046,736 | A | * | 9/1991 | Bridgeman et al. | 463/13 |
|---|---|---|---|---|---|
| 5,116,055 | A | * | 5/1992 | Tracy | 463/27 |
| 5,359,510 | A | * | 10/1994 | Sabaliauskas | 700/91 |
| 5,603,502 | A | * | 2/1997 | Nakagawa | 273/292 |
| 5,755,621 | A | * | 5/1998 | Marks et al. | 463/42 |
| 5,779,549 | A | | 7/1998 | Walker et al. | |
| 5,813,913 | A | * | 9/1998 | Berner et al. | 463/40 |
| 5,828,843 | A | | 10/1998 | Grimm et al. | |
| 6,039,648 | A | | 3/2000 | Guinn et al. | |
| 6,068,553 | A | * | 5/2000 | Parker | 463/27 |
| 6,077,163 | A | * | 6/2000 | Walker et al. | 463/26 |

(Continued)

FOREIGN PATENT DOCUMENTS

DE 299 22 111 U 5/2000

(Continued)

*Primary Examiner*—Robert Pezzuto
*Assistant Examiner*—Milap Shah
(74) *Attorney, Agent, or Firm*—Fish & Richardson P.C.

(57) ABSTRACT

An on-line gaming environment provides a forum for competitors to play against each other. Each competitor pays a fee for a game which comprises a number of rounds. A prize fund is generated for each competitor from their entry fee and the prize for a round is the combined prize funds of the two competitors. In each round, opponents are selected at random. A player who loses any rounds is eliminated from the game. A player who wins a predetermined number of consecutive games wins the accumulated fund. Players may select between a number of available games to play and may switch which game is being played in between rounds.

42 Claims, 6 Drawing Sheets

PLAYING SCREEN

U.S. PATENT DOCUMENTS

| | | | |
|---|---|---|---|
| 6,110,041 A * | 8/2000 | Walker et al. | 463/20 |
| 6,117,013 A | 9/2000 | Eiba | |
| 6,196,918 B1 | 3/2001 | Miers et al. | |
| 6,203,429 B1 * | 3/2001 | Demar et al. | 463/20 |
| 6,224,486 B1 | 5/2001 | Walker et al. | |
| 6,244,958 B1 * | 6/2001 | Acres | 463/26 |
| 6,309,299 B1 * | 10/2001 | Weiss | 463/20 |
| 6,354,592 B1 * | 3/2002 | Virzi | 273/138.1 |
| 2002/0111213 A1 * | 8/2002 | McEntee et al. | 463/42 |
| 2002/0165024 A1 * | 11/2002 | Puskala | 463/40 |

FOREIGN PATENT DOCUMENTS

| | | |
|---|---|---|
| WO | WO98/00210 | 1/1998 |
| WO | WO00/29084 | 5/2000 |
| WO | WO00/71218 | 11/2000 |

\* cited by examiner

GAME SELECTION

PLEASE CHOOSE YOUR PREFERRED GAME FROM THE LIST SHOWN ON THE RIGHT.

YOU MAY CHANGE YOUR NOMINATED GAME ONLY ONCE DURING YOUR RUN OF FIVE.

CLICK HERE FOR GAME PLAY SIMULATION;
TO AID YOUR GAME CHOICE, THIS SIMULATION WILL DISPLAY THE CURRENT REAL TIME GAME SITUATION FOR ACTIVE PLAYER NUMBERS, AND PRIZE FUNDS.

122 — [ SIMULATION ]

ONCE YOU HAVE CHOSEN YOUR GAME, PLEASE CONSULT THE "5 FOR A FORTUNE?" RULES FOR THIS GAME BY CLICKING HERE; 124 — [ RULES ]

CLICK HERE TO CONFIRM YOUR CHOICE; 126 — [ CONFIRM ]

GAMES
- PONG (ATARI TENNIS)
- SEGA RALLY
- TIC TAC TOE
- NOUGHTS AND CROSSES
- CHECKERS
- SPACE INVADERS
- BACKGAMMON
- QUAKE
- BRIDGE
- WORLD CUP SOCCER
- PACMAN

RANDOM OPPONENT SELECTION SCREEN

YOUR CHOSEN GAME:     DRAUGHTS (CHECKERS) —130

(YOU STILL HAVE YOUR SINGLE GAME CHANGE OPTION AVAILABLE):    [ CHANGE GAME SELECTION ] —132

CURRENTLY ACTIVE CHECKERS PLAYERS:    1,045 —134

YOUR CURRENT PRIZE FUND:    £ 100.00 —136

PLEASE CLICK HERE TO BEGIN RANDOM OPPONENT SELECTION:    [ SELECT ] —138

```
TODAYS CHECKERS PLAYERS
TOP PRIZE FUND LIST:

SID (LONDON)              £ 10,000,000.00
NANCY (PARIS)             £  1,500,000.00
FRED (NEW YORK)           £    756,000.00
PETER (MONTREUX)          £    200,000.00
COMPUTER PLAYER 19        £    100,000.00
FRANCIS (CAPETOWN)        £     72,500.00
CAROLINE (SYDNEY)         £     46,500.00
DENIS (LYONS)             £     24,650.00
```
—140

YOUR OPPONENT : _____ —142

YOUR OPPONENTS PRIZE FUND: _____ —144

FIGURE 3

TALENT LADDER

| NAME | GAMES | WINS | WIN RATIO | MONEY | CURRENT FORM |
|---|---|---|---|---|---|
| SID (LONDON) | 210 | 189 | 90% | £10,000 | WWLLW |
| PETER (MONTREAUX) | 130 | 104 | 80% | £76,000 | WLLWW |
| AGNES (MOSCOW) | 420 | 273 | 65% | £286,638 | LWWWW |

FIGURE 4

ON-LINE GAMING WITH INDEPENDENT PLAYER MATCHING

FIELD OF THE INVENTION

This invention relates to an on-line gaming method and apparatus, and in particular to a competition format that allows participants to play a variety of games against each other on-line, for a monetary, or other reward.

BACKGROUND TO THE INVENTION

A number of competitive games can presently be played on-line, for example over the Internet. One example is a game call East End Arrows, a darts game. In 2001 it was estimated that 70 million on-line games were played through that site with each visitor to the site playing three games per visit over a period of about 30 minutes. These figures imply that about 63,000 darts players are participating in the on-line game each day.

One of the largest on-line gaming sites is backed by Microsoft Corp and is found at zone.msn.co.uk. This site has over 18 million registered users and is easy to access and navigate. It has a wide selection of games, many of which are free, and premium games for which a charge is made. The site includes a chat room and a friends messaging service encouraging a sense of on-line community. The site runs tournaments and competitions in conjunction with sponsors with relatively modest prizes. The tournaments are usually based as a knock-out system or a league table system. Neither system is ideal, especially to the casual player or beginner. In the knock-out system, the casual player will often be eliminated easily in the first round by a more skilful and committed player. In the league system, those committed players tend to dominate with a small number of players always winning the leagues. Neither of these scenarios are attractive to competition organisers who want to encourage as broader participation in the tournament as possible and so maximise their revenues. For that aim to be achieved, casual visitors to the site must feel comfortable taking part in games and feel that they have a realistic chance of winning.

Other on-line gaming sites include flipside.com, worldwinner.com and sportsmad.com. The latter has introduced a rule prohibiting individual players from claiming more than one top score prize per month in an attempt to overcome the domination problem. However, it is the structure of the gaming method that gives rise to the problem and this is not addressed.

As well as games web sites, there exist a number of quiz and competition sites. One example is iwin.com run by Uproar Inc. This is a games for prizes and Internet lottery site. Players win "icoins" and exchange them for prizes. It also provides links to free lotteries such as extremeloto.com.

Worldwinner.com allows players to compete for cash prizes against other players across a range of games such as chess and checkers. In many countries such tournament games are legal. The tournaments include limited entry competitions where there is a pre-set number of participants; progressive jackpot tournaments with an unlimited number of participants but which end at a set time; and head to head games where two players play directly against each other for a chosen entry fee.

Entry fees vary depending on the tournament but are usually between about $1 and $10 with prizes ranging from about $1.25 to $90.00. Players are automatically assessed and placed in skill categories with tournaments often being held for players of a single skill category. As with other tournament games, this site suffers from dominance by a small number of skilled players, with the organisers encouraging participants to practice harder or try playing at different times of day.

Other quiz game and competition sites include tombola.com, boxerjam.com and speedyclick.com.

There also exists a number of on-line lottery sites such as freelotto.com, monstermillions.com and extremelotto.com. These types of sites tend to be similar, requiring the player to choose six or so numbers and click on a submit button, or an advertisement to register their entry. Prizes range from about £1,000 to $10,000,000 with the odds of winning ranging from about 1 in 25 million (freelotto.com) to as much as 1 in 814 million (webmillion.com).

None of the existing gaming, tournament and lottery sites provide an experience in which the casual user can have a reasonable expectation of winning or performing well. Knock-out and league style tournaments tend to be dominated by key players and suffer from the further disadvantage that endless practice is required to reach a skill level where there is a reasonable chance of winning.

Tournament competitions suffer from the further disadvantage that competitors have to wait for the tournament to come around, which might be on a daily, weekly or monthly basis.

SUMMARY OF THE INVENTION

The present invention addresses the abovementioned disadvantages.

The invention, in its broadest form randomly draws players against each other. Each player contributes a prize fund and the winner receives the loser's prize fund. A player must win a number of consecutive games against randomly selected opponents before the prize fund can be converted into an actual prize.

More specifically, the invention is defined in the independent claims to which reference should be made.

Embodiments of the invention have the advantage that the problems with knock-out, one-on-one, and tournament games are avoided. As the opponent is preferably selected entirely randomly, the novice or moderately skilled user has a good chance of being matched against a similarly skilled opponent. This avoids domination by particularly highly skilled players. Furthermore, as a number of rounds have to be won before a prize fund can be collected, for example five, very substantial prize funds can be generated, making the game exciting and attractive to players.

Other preferred features are set out in the independent claims and their advantages discussed in the following description.

BRIEF DESCRIPTION OF THE DRAWINGS

Embodiments of the invention will now be described, by way of example only, and with reference to the accompanying drawings, in which:

FIG. 2 is a game selection screen displayed at a player terminal;

FIG. 3 is an opponent selection screen displayed at a player terminal;

FIG. 4 is a display of most successful players;

DESCRIPTION OF BEST MODE

The gaming structure to be described may be Internet based or made available through, for example, digital television or other on-line access. It allows potential competitors to log onto the online network and participate in games. The participants pay a small fee per game and select a game to play. A short series of games are then played against randomly chosen opponents from around the world. Participants can win large sums of money or other equivalents from playing the games.

Players are required to win a predetermined number of games consecutively before they can claim their accumulated winnings. The preferred number of games is 5. By requiring consecutive winning of games, the disadvantages of tournament style and one-on-one games are avoided.

The consecutive games required to win are not played against the same opponent. Before each game commences, a computer system selects an opponent for that game at random. In this way, players of average skill are likely to be matched against other players of average skill. It is not necessary to defeat a champion or highly skilled player to win, although such a player may be randomly selected as an opponent. There are no league tables or reliance on highest scores, players merely need to defeat a series of randomly selected opponents.

Each competitor contributes a small participation fee to each game they play. The winner of each round of the game collects the stake money or prize fund from his defeated opponent. This prize fund is then taken by them into the next round and so accumulates through the rounds of the game. Each new opponent brings their own prize fund to the game. This will be of an unknown amount as it will depend entirely on the prize fund they have won in previous rounds. They could be playing their first round of a game or their fifth and their prize fund may vary between the basic entry fee and a very substantial amount. this helps to generate excitement and interest in the game.

Games may be begun at any time of day or night. A game must be completed with a fixed period, for example one month. This differs from tournaments which run at specific times.

Thus, the requirement of a minimum number of consecutive wins, and the accumulation of a prize fund provided by the player and opponents selected, preferably at random for each round of the game provides a gaming format which overcomes the disadvantages of the prior art discussed above. In addition, players have the potential to win large sums of money on a small entry fee although for any given game, the player has no idea of the total prize fund available as it depends on the prize fund of each selected opponent in each round.

Within the structure described above, a number of other sub-formats may be adopted, such as jackpot computer players, sponsored computer players and charity players. These will be described in detail below.

Figure 1:
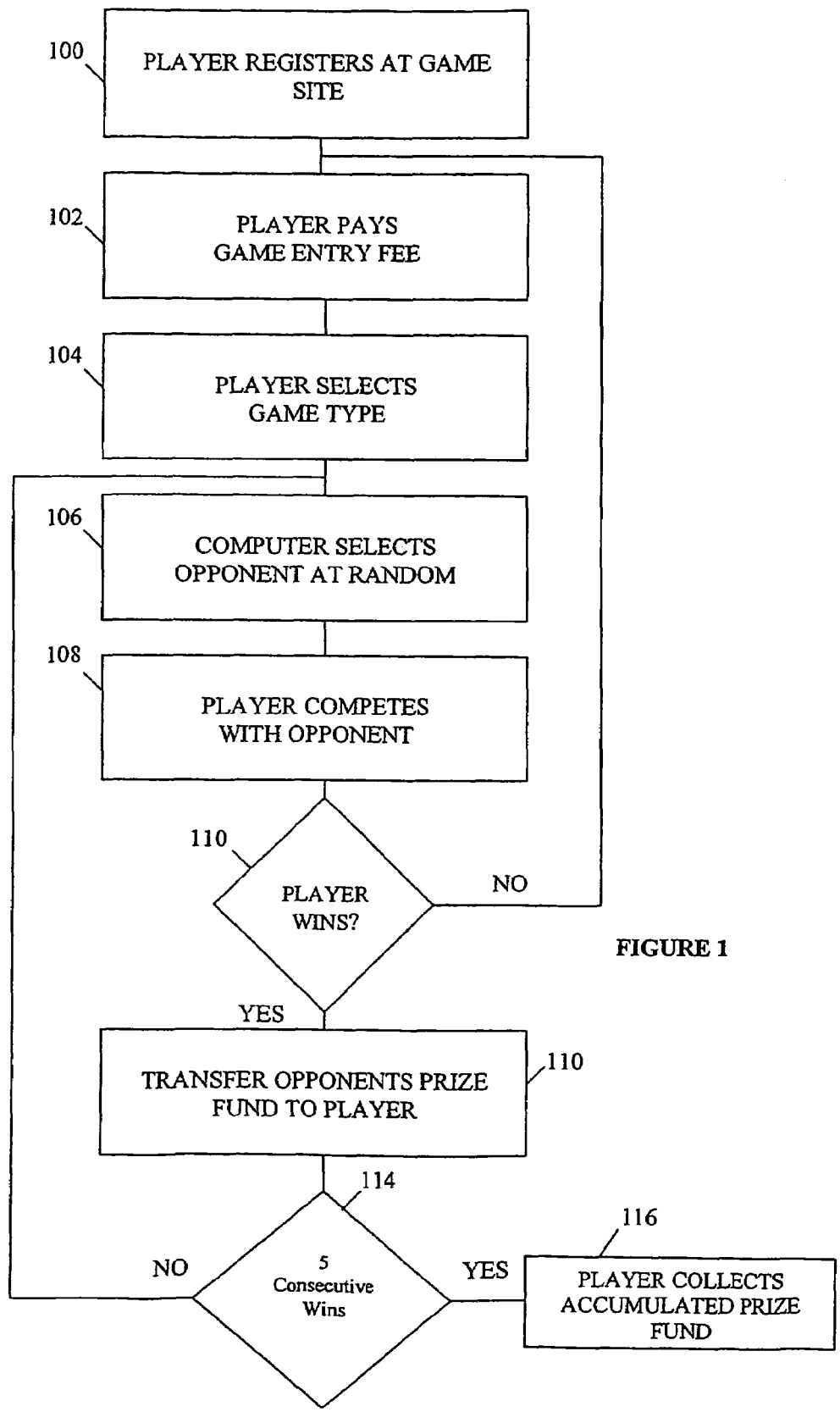
FIG. 1 is a flow diagram illustrating an embodiment of the invention.

FIG. 1 is a flow chart which illustrates the basic game as described above. Thus, at step 100, a player registers at the game site to play games. At step 102 he or she pays a game entry fee and at step 104 selects a game type from an on-screen menu. At step 106 the computer selects an opponent at random. At step 108 the player competes against that opponent. If he loses 110, the process returns to step 102 and the player must pay a further game fee to participate again. If he wins, at step 112 the defeated opponent's prize fund is transferred to him and added to his prize fund. The computer at 114 examines the players record to determine whether he has had five consecutive victories. If he has, the player can collect his accumulated prize fund at 116. If he has not, the victory is logged and a counter incremented and the process returns to step 106 where a further opponent is selected for the next game. That next games does not have to be played immediately. When the player indicates to the system that they want to play again, within the one month game period, a new opponent will be selected and a new game commenced.

Features of the process described in relation to FIG. 1 will now be described in more detail.

Each player must fill in a simple and quick registration form before playing the game. Players have access to this registration process (and every subsequent playing screen) in their own language. During the initial registration process there is a one-off download of the appropriate software onto the users computer, phone, console or IDTV, which allows the game to work on future visits from that particular terminal.

The registration process includes the opening of a playing account, and in association with this new account, each player must provide details of their nominated payment account or credit card. The new player then chooses or creates their player name. They are then issued with a valid account number and password.

Other payments including checks and on-line micropayments are possible.

The allocation of this password occurs as soon as possible, but only when, and if, the new user's bank details and age have been verified. The time lag created by the credit check will also allow the system to check the identity of the proposed new user against available registers of known problem gamblers.

To play each game requires payment of a fee, for example $1.00 to the system. This fee is paid in the local currency Dollar equivalent i.e. Euros or Pounds etc. The system bank sets and controls the rate of exchange in operation in line with the current market rates.

The user's account can be topped up with sufficient credit at convenient intervals from the user's nominated bank account or credit card. This allows the payer to pay for and play games through the account, without the need for the user to access their bank account or credit card on a game-by-game basis. The account, or e-cash system, provides greater security, convenience and control for all parties.

Preferably there is a minimum initial account opening payment, for example $5.00, allowing the paying of 5 separate games, and a similar subsequent minimum credit transfer sum.

Any prize fund won by the user may be credited to their account, or paid directly into their nominated bank account or credit card account. Alternatively any other payment method such as cheque or micropayments may be used.

The system operations in association with their bankers, determine a sliding scale for the appropriate time delay necessary when paying out winnings. Small prizes may be credited on the next working day, whilst larger ones may take a little longer. This delay for the bigger prizes will allow the player time to adjust to the idea of becoming rich, and indeed to give the system operators the necessary time to organise the release of the funds.

The system operator retains a small portion of each game fee, for example $0.05 to cover costs, and to provide for a small operating profit. The majority of the remaining $0.95 of the playing fee forms each player's first round prize fund contribution, with a smaller sum being used to create a few large prize funds for a limited number of nominated Jackpot Computer Players these are discussed below.

The creation of Jackpot Computer Players provides the immediate attraction of large prize funds to play for, which will be available to be won instantly by players. It is presently proposed $0.75 will go towards the first round prize fund, and $0.20 will be contributed to Jackpot Computer Players.

FIG. 2 shows the game selection screen that is displayed to the user after he or she has registered with the system and payed their opening payment or game fee and been presented with an instruction sheet explaining how games are played. The player must then select a game to play from a list 120 presented on the screen. The selection shown in FIG. 2 is purely exemplary. The list may be provided as a drop down menu or in some other form.

Each game requires a brief one off initial download of the actual game play software onto the users terminal. The length of the download will be governed by the complexity of the game chosen. The games offered may be basic versions of the world's most popular computer games such as Checkers and Pong, which only require extremely short downloads.

The system may also offer the ability to play the latest and most advanced computer games on line. These games will require either a long software download, or the existence of a proprietary CD version of the game to be present in the clients computer (or pre-installed on their digital television etc.).

The user may select between two player and multiplayer games. Both operate on a winner takes all basis, subject to the rules applicable to games with a combined prize fund total in excess of $100,000, discussed below.

On selection of a game, a player will be able to enter a game Simulation Screen 122.

This Simulation Screen indicates the current number of active players for the game, and displays an enticing list or league table of the current top prize fund holding players committed to this particular game.

It also provides access to ranking tables where players with the best win/lose ratios, and the longest winning streaks etc. will be listed for information purposes only. An example of this is shown in FIG. 4. The Simulation Screen also gives access to the rules for each particular game, and the parameters and preferences under which it is being operated. It allows players to play unlimited numbers of practice games against the computer at no extra cost, excluding any cost of connection tariff.

The player may also view the rules from the game selection screen of FIG. 2 by clicking on a Rules button 124. Once the user is happy with their game selection they click on a confirm button 126 to confirm their selection.

Within the course of a game of five rounds, the user is allowed to change the game that is being played only once. Other embodiments may permit more than one game change or even allow a different game to be played on each round.

FIG. 3 shows the opponent selection screen. The screen displays to the user the game that has been chosen at 130 and indicates at 132 whether they still have the option of changing the game, allowing them to click to change the game, in which case the game selection screen is displayed again. The screen displays the number of currently active players for the chosen game at 134 and the value of the player's current prize fund at 136. In order to encourage the payer, a portion 140 of the screen displays a list of the top prize funds who have played the game that day. The player can evaluate from the number of active players whether they have a realistic change of being selected against one of those players.

If the player wants to continue, he clicks on a "select" button 138. The computer then instantaneously selects an active opponent at random. The paying identity of this opponent is then displayed at 142 and the prize fund of that opponent at 144.

If no active real opponent or opponents for a multiplayer game can be allocated within a few seconds, the computer will then immediately provide a computer player opponent or opponents.

Real players may decline the invitation to play a computer player, and choose instead to wait in the Game Room until a real opponent or opponents become available.

Multiplayer games will allow players to wait longer in the Game Room for a full compliment of real players, or players can choose to be involved in an instantaneous game including a combination of real players and computer players.

If active real opponents do not become available within a reasonable time frame, then the player may exit from their chosen game to return later. Players may alternatively also invoke their right to change their chosen game once; and transfer to a game with more active players, or indeed a game with higher top prize funds available.

The game play software ensures that players are only matched with opponents with a similar connection speed if possible. If an opponent with a similar connection speed cannot be secured, then the playing software will be used to reduce the connection speed of the player with the faster connection, or alternatively, players will be matched with a computer player with a similar connection speed. In this way one player does not have an advantage over the other.

When a game has the correct number of computer players, then all players must confirm that they are ready to play, at which point the game will be started.

Figure 5:
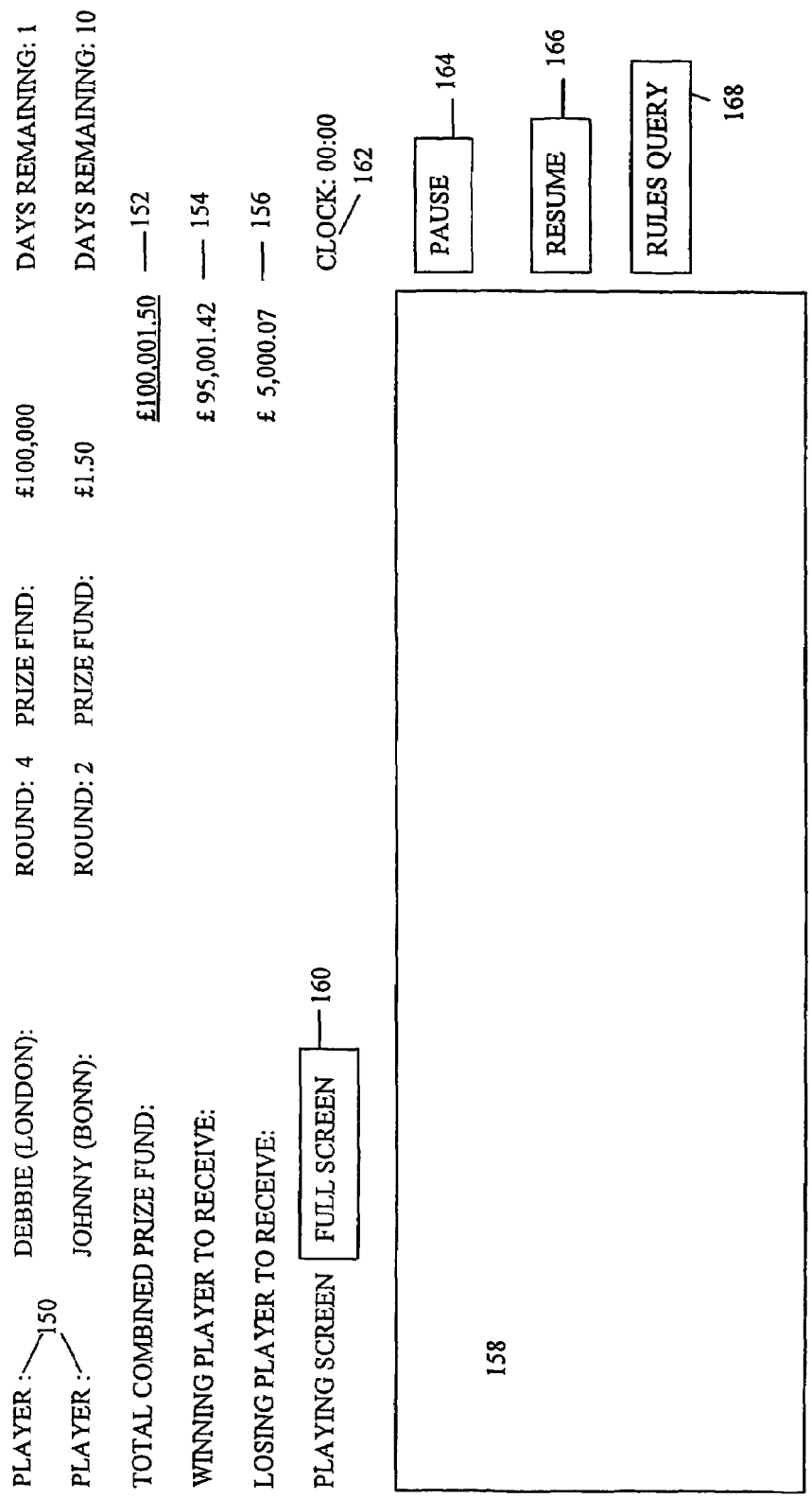
FIG. 5 is a playing screen displayed at a player terminal.

FIG. 5 shows a playing screen that is displayed to the player once the opponent has been selected. The identity of the two parties is shown at 150 together with the round of the game that each is playing, their prize fund and the days left before they must complete the game. At 152 the total prize find for the round is shown and at 154 and 156 the distribution between the winner and loser is shown. In the example of FIG. 5, the winner receives 95% and the loser 5% as the fund is over $100,000. If it was below that amount, the winner would receive all the fund.

Underneath the game details display is the playing screen 158 which can be enlarged to full screen by clicking on a full screen button 160. A clock 162 shows elapsed game time at buttons 164 and 166 allow a player to pause and resume the game. A button 168 allows a player to query the rules of the game.

Computer players are generated by the system to provide instantly available opponents for real players. Computer players are programmed with varying skill levels, and it is made clear to all players that this skill level is biased towards the beginner/intermediate skill level, giving real players a reasonable expectation of success against a computer player.

The computer generates computer players with varying amounts of modestly sized prize funds if there is no free active, fee paying real opponent available at any one time.

Additionally, to create an immediate incentive for real players, each game will always contain several jackpot computer players with various significant amounts pre-set into their prize funds, thus introducing the instant possibility for players of winning large cash prizes.

The jackpot computer players are predominantly or entirely funded from the $0.20 rake off of each real players playing fee, diverted at source specifically for this task.

Computer plays may on occasion be allowed to float freely between the various types of individual games on offer, depending on the value of the highest prize funds available in each type of game.

One prize fund per game will be permitted to accumulate an unlimited cash prize. All other prize funds within the game will be limited to a top prize for example, of $10,000,000 and any further potential fund increases as a result of match play is diverted into a newly created computer player prize fund. Any two real players share prize funds equal to and in excess of $100,000; the winner to receive 95% and the loser to receive 5%, so that overbearing disappointment for the loser can be avoided. Players are responsible for their own local tax liabilities etc. should they exist.

In a preferred embodiment, sponsored computer players are provided which operate as normal jackpot computer players, but with their pre-loaded high value prize funds supplied by a sponsoring company.

Each sponsored computer player plays under the name or title of the sponsoring company, and which place a slogan or by-line alongside the company player name. Sponsored computer players are not eligible to collect their prize fund after 5 consecutive round victories. Rather they roll on to the next opponent with the combined accumulative prize funds. Sponsored computer players are played on the sponsoring company's behalf by the system computer at a relatively high or expert player skill level, in order for the sponsored player to remain visible and active for a significant period. The greater the prize fund donated by the sponsoring company, then the higher up and more prominently it will be displayed on the league table of player's prize funds as seen on the simulation room screen or the opponent selection screen.

In an alternative embodiment, exposure may be increased by allowing the sponsoring company to employ a celebrity or expert real player to play on their behalf, thus creating additional publicity potential.

The system may also make considerable and significant contributions to charity through the creation of charity players. The facility to run charity players is offered to chosen charitable bodies, and each charity player will be granted a significant number of free game play credits per week or month thus allowing each charity player to participate in the full game network at no cost. Charity players can compete in any of the games supported by the system in the manner described above, and can keep all of the accumulated prize funds following a fifth consecutive victory in accordance with the normal rules. The role of the charity players can be played either by the computer, with a relatively high skill level, or by volunteers for the charity itself.

In an embodiment of the invention, players with extremely large prize funds who reach their final round and the players who are drawn as their opponents, may be invited on to a television show, to play the final round of the game out live on television. Both players may be offered an additional fee to appear on the show, and both players must agree or disagree within a given time frame to appear on the show.

If one of the players values their anonymity, and declines the invitation to appear on the television show, then that player may play the game under supervised conditions in a regional centre, and remain anonymous.

If both players decline the invitation to appear on the TV show, then both players may be allowed to play the game immediately online.

Each participating country, or time zone within a participating country, may have its own regular version of the television show, and the televised final round games will be scheduled to best suit the location of the two players involved. Highlights of the various shows may be combined to produce a weekly "best of" syndicated show.

In order to provide security and consumer protection, the system monitors players compulsive playing habits, and so prevent compulsive playing and spending. Each player may not be permitted to exceed an agreed permissible spends which may be related to a salary declaration or general credit rating.

Players are required to set up an e-cash account and transfer specific funds to this account with which to play the game. Players must nominate an existing bank account to work in conjunction with their account. This account will be used to top up the account, and will be the default deposit account for cashed-in wins. Again, other payment options are possible.

Players may also obtain a Smart Card with their first $5.00 stake money, which will allow them to play in pubs and bars, and any other public outlet. This Smart Card contains an electronic identity for each player, together with digital-signature technology allowing the exclusion of both under age and problem players, and fraud. The Smart Card has a PIN/signature/password, which must be keyed into the web site before access to the game, or the players account is permitted.

In one preferred embodiment, small winnings are credited to the Smart Card and used for further game plays, or card purchases on the web.

In one preferred embodiment, users may elect to watch games being played for real by other players. This, in conjunction with the ability to practice games, improves the user's skill and tactics in a game.

In the basic embodiment of the game discussed above, each player pays an amount, for example £1 or $1 per game. No further payments are required after each round within the game. All net payments, after deductions of system costs and profit are combined from each player to produce the total prize fund for a round of the game.

In one implementational embodiment, where the games are played through interactive digital television, the payments into a player's account may be made based on premium rate telephone line payments. In another embodiment, also suitable for playing on the Internet, debit or credit card payments are required. Where phone line payments are used, pre-registration of players may not be required.

In a second scenario, the basic game is modified to include jackpot computer players as discussed above. The game structure is the same as the basic game structure except that an additional sum is deducted from the player payments to provide the jackpot computer player prize fund. It is intended that these funds will be large.

In one modification, players pay for each round they contest. This may be an even fee of for example, £1 per round requiring £5 for a successful game; or may decrease, for example by 20 p or 20 c per round. Thus, the second round could cost 80 p and the final, fifth round 20 p. Both of these options significantly increase the prize funds and therefore the attractiveness of the games.

In any of these variations, cash prize funds may be substituted by points prize funds. The entry fee is converted into a number of points which can be exchanged for prizes at or below the equivalent monetary value.

In a further modification, a first round player may be prevented from meeting a further first round player. This may be achieved using computer players with a seeded prize fund of £0.80 which is equivalent to the joint prize fund that would have been accumulated by two first round players playing together. Alternatively, first round players may avoid one another by ensuring that they are always drawn against a second, third, fourth or fifth round player.

In the implementation of the gaming method described above, and its various alternatives, standard Internet web server technology and scaling methodology can be used together with known game server management technology and game server entity object prioritisation, bandwidth and latency management.

Presentation and attraction is preferably performed through a standard portal within a known HTTP (Hypertext transfer protocol)/HTML (Hypertext mark up language) based environment. This allows presentation to at least PCs and Apple Macintoshes running W3C compliant Internet Web Browsers. For a IDTV implementation middleware is provided on a conventional set top box with additional middleware being supported provided the boxes are W3C compliant. Suitable boxes include those provided by Liberate, PowerTV and MSTV. WML devices may be provided for by a transcoder arrangement or through a dedicated representation of the HTML portal. If mobile support is not required, no transcoder or WML site is necessary.

The various screens described above and illustrated in FIGS. 2 to 5 are presented in an HTML environment and are mainly integrated into the initial portal. This enables potential challengers to browse and chat with other potential challengers without being billed. An example of this is the simulation discussed above. However, once a player has commenced a game, no exchange of messages is permitted.

The lobby environment, where challengers are selected to play against each other is centralised so that payers in different countries can play against each other regardless of physical or network location. The lobbies therefore support hundreds of thousands of concurrent users using standard world wide web technologies and known horizontal scalabilty methodology.

In practice, the billing of players may be performed by a third party or even different third parties in different geographical regions. When players have been matched together by the central game computer the lobby requests that the appropriate billing system bills each of the contestants the entry fee as discussed above. This is a real time process and must return a success/failure answer before the game can proceed.

When both players are successfully billed for the entry fee, the lobby decides on the best game server for the game to take place on. The game executable is then directed to the specific IP address and part of that server so that the game can be played. The selection of the applicable game server should ensure, as far as possible, that one party does not have an advantage over the other.

The game servers are independent and are capable of handling transparently hundreds and thousands of concurrently running game sessions. The games series are transparently distributed around the world without users being aware.

The game as described in relation to the figures is implemented such that different devices can access it. For example, different executables are provided for PC and Play Station™ users although generic middleware is used to permit easy scalability of game sessions.

Device specific extensions are used to improve the in-game experience provided that they do not give a player an advantage over one using a different device. For example, high quality rendered explosions may be present on a Nintendo Game Cube™ platform but a much lower quality in a set-top box platform.

The local game client must honour any network instructions passed to it by the network partner relating to bandwidth management. This is typically handled by middleware. The central game server ensures that where one client is asked to reduce or increase the entity synchronisation rate the other is also so asked to maintain fairness.

In view of the flexibility of the devices which can be used to play the game, in the preferred implementation. Five buttons are used to control any game that is played: up, down, left, right and a generic "action" button. This approach maps well onto set top box remote controls and mobile phones as well as more complex input devices.

Figure 6:
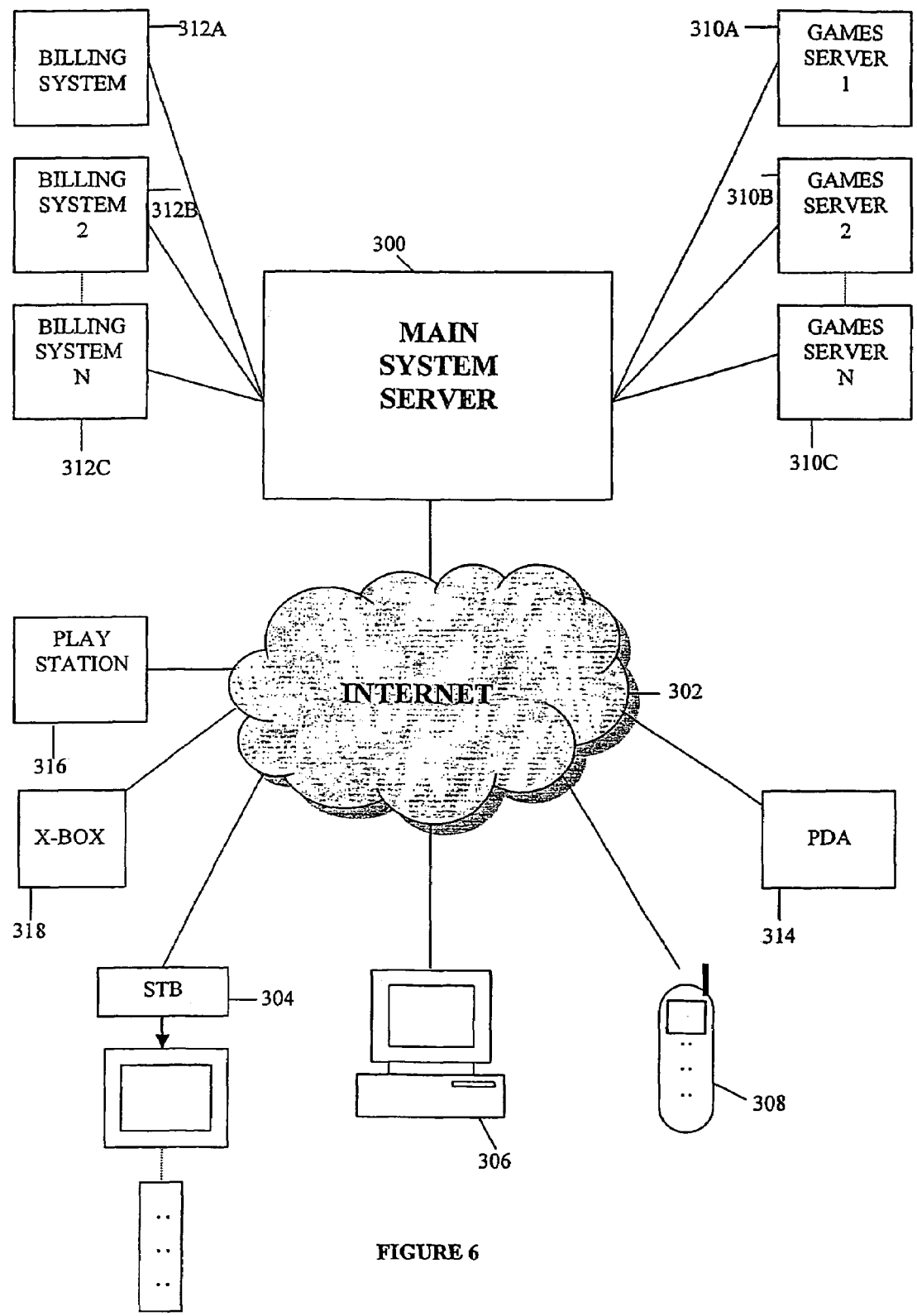
FIG. 6 is a schematic diagram of a system embodying the invention.

The overall architecture of the system is illustrated in FIG. 6. The main system server 300 is connected as described across the Internet 302 to the players who participate via IDTV and set top box 304, PC 306, mobile phone 308, PDA (Personal Digital Assistant), games console such as a Play Station console 316 or Microsoft X-Box 318, or some other input device.

The management of the game itself includes the registration of users, the provision of game information and screens such as those shown in FIGS. 2 to 5 is handled at the main server 300. That server includes appropriate memory to store player records, details of games in progress, prize funds etc. It also includes a random number generator for selecting opponents from a database of possible opponents as described above. The main server 300 communications with the plurality of games servers 310a, 310b . . . 310c and exchanges games related data in accordance with standard protocols. The main server 300 also communicates with a plurality of billing systems 312a, 312b . . . 312c as described above. These communications will include the exchange of fees and the clearing of fees and also the transfer of winnings from the main server to the billing system.

It will be appreciated that this representation is schematic and many other variants are possible without departing from the scope of the invention.

The invention claimed is:

1. A method of operating an on-line gaming system comprising the steps of:
   a) receiving a fee from each of a plurality of players to play a game comprising a plurality of game rounds;
   b) establishing a prize fund for each player;
   c) allowing one or more additional players to join the game after the start of an earlier game round, the allowing comprising receiving a fee from each of the additional players and establishing a prize fund for each of the additional players;
   d) matching two players of the game together to play a game round for a winning prize fund provided from each player's prize fund, the matching being independent of a number of game rounds each player has won and independent of when each player joined the game;
   e) transferring the winning prize fund provided from each player's prize fund to the player winning the game round;
   f) eliminating at least one player who loses the game round from the game;
   g) repeating steps d), e), and f) for a plurality of game rounds until a player has won a predetermined number of consecutive game rounds; and
   h) awarding the player who has won the predetermined number of consecutive game rounds the amount of the awarded player's prize fund, wherein the awarded amount is at least a portion of the total of prize funds of each player that the awarded player has defeated within the predetermined number of consecutive games rounds and the awarded player's initial prize fund.

2. A method according to claim 1, wherein the matching of players is by random selection from a pool of players.

3. A method according to claim 2, wherein the pool of players includes players generated by and controlled by the gaming system.

4. A method according to claim 1, comprising each player selecting a game round type from a plurality of available game round types, wherein the matching is performed on players having selected the same game round type.

5. A method according to claim 4, wherein a player can change his game round type at least once in the game.

6. A method according to claim 1, wherein the prize find at step b is derived from a players game fee less an administrative cost.

7. A method according to claim 6, wherein a jackpot fee is deducted from each entry fee.

8. A method according to claim 7, wherein the jackpot fee provides the prize fund for a jackpot player played by a computer.

9. A method according to claim 1, wherein each player contributes a game round fee for each game round of a game played.

10. A method according to claim 9, wherein the fee for each game round is the same.

11. A method according to claim 9, wherein the fee for each subsequent game round is less than the fee for the previous game round.

12. A method according to claim 1, wherein the fee is based on premium rate phone line payments.

13. A method according to claim 1, wherein the fee is debited from or charged to a debit card or charge card.

14. A method according to claim 13, comprising conducting a credit check on each customer before permitting a game to commence.

15. A method according to claim 1, wherein the prize fund is a currency amount and a winning player is paid a currency value after winning a predetermined number of consecutive game rounds.

16. A method according to claim 1, wherein the prize fund is an accumulation of points and a winning player may convert the points in the prize fund into prizes after winning a predetermined number of consecutive game rounds.

17. A method according to claim 1, wherein the winning player is awarded the amount of his prize fund after five consecutive victories.

18. A method according to claim 1, comprising displaying to players the identity of an opponent in a game round and that opponent's prize fund.

19. A method according to claim 1, comprising, prior to matching of players together, displaying to a player a list of top prize funds held by players which whom the player could be matched.

20. A method according to claim 1, wherein if the winning prize fund is greater than a predetermined amount, a portion of the prize fund is given to the loser and the remainder to the winner.

21. A method according to claim 20, wherein the portion given to the loser is 5%.

22. A method according to claim 1, wherein at least one of the players comprises a team of more than one person.

23. A method according to claim 1, wherein the plurality of players include charity players who contribute no fee to play a game.

24. A method according to claim 1, comprising providing a free on-line simulation of the game to a player prior to payment of a fee for a game by that player.

25. A method according to claim 1, wherein the matching of players prohibits the matching of players both or each playing the first game round of a game.

26. A method according to claim 1, wherein a player is matched against a computer generated player in a first game round of a game.

27. A method according to claim 1, comprising providing a practice facility to allow players to play games without being matched against other players.

28. A method according to claim 1, comprising providing a non participating player with a display of a game in progress between two competing players.

29. The method of claim 1, wherein at least one of the additional players is a previously eliminated player.

30. The method of claim 1, wherein the awarded amount equals the total of prize funds of each player that the awarded player has defeated within the predetermined number of consecutive games rounds and the awarded player's initial prize fund.

31. The method of claim 1, further comprising repeating the allowing during the game.

32. A method of operating an on-line gaming system comprising:
  receiving from each of a plurality of players a fee for a game comprising a plurality of game rounds;
  establishing for each player a prize fund based on the received fee;
  allowing one or more additional players to join the game after the start of an earlier game round, the allowing comprising receiving a fee from each of the additional players and establishing a prize fund for each of the additional players;
  offering the players a choice of games to play and receiving a game selection from players;
  randomly matching two players having the same game selection and independently of the number of game rounds each player had won and independently of when each player joined the game to play against each other for a prize fund equal to the sum of the prize funds of each player;
  eliminating the loser from the game;
  randomly matching the winner with a player, independently of the number of game rounds the player has won and independently of when the player joined the game, to play a further game round of the game until the player either loses a game round or wins a predetermined number of consecutive game rounds; and
  awarding at least the majority of the total accumulated prize fund to the winner after the predetermined number of consecutive victories, wherein the awarded amount is at least a majority portion of the total of prize funds of each player that the awarded player has defeated within the predetermined number of consecutive games rounds and the awarded player's initial prize fund.

33. A method according to claim 32, wherein all the accumulated prize fund is awarded to the winner of the predetermined number of consecutive victories unless the fund is greater than a predetermined amount.

34. The method of claim 32, wherein at least one of the additional players is a previously eliminated player.

35. The method of claim 32, wherein the awarded amount equals the total of prize funds of each player that the awarded player has defeated within the predetermined number of consecutive games rounds and the awarded player's initial prize fund.

36. The method of claim 32, further comprising repeating the allowing during the game.

37. An on-line gaming system comprising:
a system server communicating on-line with a plurality of players;
a games server coupled to the system server for executing software relating to a plurality of game rounds to be played by the player;
a billing computer coupled to the system server for providing game playing fees to the system server on instruction from games players;
wherein the system server comprises:
means for allowing one or more additional players to be placed in a new game round after the start of an earlier game round;
means for randomly generating a game round opponent for a player from available players independently of a number of game rounds the player or the available players have won and independently of when each player joined the game;
means for assigning a prize fund owned by each player of a game round to the winner of the game round;
means for eliminating the loser of the game round from the game;
means for communicating a total accumulated prize fund to the billing computer on completion of a predetermined number of consecutive victories by a player, wherein the total accumulated prize fund is at least a portion of the total of prize funds of each player defeated by the player who has the predetermined number of consecutive victories; and
means for awarding the total accumulated prize fund to the player who has won the predetermined number of consecutive game rounds.

38. A system according to claim 37, wherein players communicate with the system via a digital telephone.

39. A system according to claim 37, wherein players communicate with the system via a PC.

40. A system according to claim 37, wherein players communicate with the system via a games console.

41. A system according to claim 37, wherein players communicate with the system via a mobile telephone.

42. A system according to claim 37, wherein players communicate with the system via a PDA.

* * * * *

UNITED STATES PATENT AND TRADEMARK OFFICE
CERTIFICATE OF CORRECTION

| | | |
|---|---|---|
| PATENT NO. | : 7,470,197 B2 | Page 1 of 1 |
| APPLICATION NO. | : 10/486863 | |
| DATED | : December 30, 2008 | |
| INVENTOR(S) | : Graham Peter Massey and Claire Gilmore McDonald | |

It is certified that error appears in the above-identified patent and that said Letters Patent is hereby corrected as shown below:

<u>Issued Patent:</u>
Column 11, Line 14.

In Claim 6, delete "find" and replace with --fund--

Signed and Sealed this

Nineteenth Day of May, 2009

JOHN DOLL
*Acting Director of the United States Patent and Trademark Office*